United States Patent [19]
Smith et al.

[11] Patent Number: 5,561,762
[45] Date of Patent: Oct. 1, 1996

[54] MALICIOUS FAULT LIST GENERATION METHOD

[75] Inventors: D. Todd Smith; Barry W. Johnson, both of Albemarle County, Va.; Joseph A. Profeta; Theo C. Giras, both of Allegheny County, Pa.

[73] Assignee: Union Switch & Signal Inc., Pittsburgh, Pa.

[21] Appl. No.: 471,417

[22] Filed: Jun. 6, 1995

[51] Int. Cl.$^6$ ........................................ G06F 11/00
[52] U.S. Cl. .......................................... 395/183.09
[58] Field of Search ................... 395/183.09, 184.01, 395/183.17, 183.01

[56] References Cited

U.S. PATENT DOCUMENTS

| | | | |
|---|---|---|---|
| 4,759,019 | 7/1988 | Bentley | 395/183.09 |
| 4,819,150 | 4/1989 | Jenning et al. | 395/500 |
| 4,996,688 | 2/1991 | Byers et al. | 395/183.21 |
| 5,046,068 | 9/1991 | Kubo et al. | 395/183.17 |
| 5,193,178 | 3/1993 | Chillarege et al. | 395/183.01 |
| 5,243,607 | 9/1993 | Masson et al. | 371/69.1 |

*Primary Examiner*—Robert W. Beausoliel, Jr.
*Assistant Examiner*—Ly V. Hua
*Attorney, Agent, or Firm*—Buchanan Ingersoll, P.C.

[57] ABSTRACT

A method for selecting and responding to a malicious fault in a reconfigurable electronic apparatus that can perform multiple tasks, and that has fault processing for counteracting a class of faults which can generally cause the apparatus to fail during the execution of a preselected task if the fault processor is unavailable and to which class the malicious fault can belong. The reconfigurable electronic apparatus can be a fault processing system, which can be an interlocking control circuit, or a combinational circuit. The method includes constructing an information flow representation of at least a portion of the apparatus executing the preselected task of interest; applying a preselected fault representation to the information flow representation and producing multiple input error conditions corresponding to at least one preselected output condition, the preselected fault representation including recursive reverse implication and, where reconvergent fanout occurs, a forward consistency check; selecting from the aforementioned multiple input error conditions at least one fault condition corresponding to the class of faults; injecting the at least one fault condition into the information flow representation and producing a malicious fault condition representative of said malicious fault; and modifying the apparatus responsive to the malicious fault condition, thereby counteracting the malicious fault. The malicious fault can belong to the class of faults occurring during execution of the preselected task by the apparatus and causing the apparatus to fail during such execution.

32 Claims, 7 Drawing Sheets

Fig. 4.

| Time | IR | Rout | R1 | R2 | Rx | IAEF |
|---|---|---|---|---|---|---|
| - | - | - | - | - | - | - |
| 3000 | - | - | - | - | - | 0010 |
| - | - | - | - | - | - | * |
| 3950 | AND Rx, F1, F2 | - | - | - | - | * |
| 4000 | - | - | - | - | 0111 | * |
| - | - | - | - | - | * | * |
| 4190 | MV IAEF, R2 | - | - | - | * | * |
| 4200 | - | - | - | 0010 | * | * |
| - | - | - | - | * | * | * |
| 4500 | ADD R1, Rx, R2 | - | - | * | * | * |
| 4550 | - | - | - | * | * | * |
| - | - | - | - | - | - | * |
| 4600 | - | - | 1001 | - | - | * |
| - | - | - | * | - | - | * |
| 4640 | MV IAEF, R2 | - | * | - | - | * |
| - | - | - | * | - | - | * |
| 4650 | - | - | * | 0010 | - | - |
| - | - | - | * | * | - | - |
| 4900 | XOR Rout, R1, R2 | - | * | * | - | - |
| - | - | - | * | * | - | - |
| 4950 | - | 1011 | - | - | - | - |
| - | - | * | - | - | - | - |
| 5000 | - | * | - | - | - | - |

250

MALICIOUS FAULT LIST GENERATION METHOD

BACKGROUND OF THE INVENTION

1. Field of the Invention

The invention relates to a method for selecting and responding to faults in a fault processing apparatus, in particular, to a method for determining and responding to faults which can cause the fault processing apparatus to fail if the fault processing of the apparatus is unavailable.

2. Description of the Prior Art

The increasing level of complexity in systems requiring high-level reliability can make the determination of system dependability a daunting task. Reliability, safety, availability, and maintainability are examples of dependability metrics that are typically of interest.

One of the central attributes of a dependable system is the probability of properly handling a fault within the system, given that a fault has occurred. This attribute is commonly referred to as the fault coverage conditional probability or simply, fault coverage. The reliability, safety, and availability of a system are all heavily influenced by the fault coverage value. For example, if the fault coverage of a system is 1, then a system is defined to always operate in a safe manner. Typically, fault coverage refers to a fault-tolerant system which has some type of active reconfiguration; that is, a system which contains spare or redundant modules or components which can be brought on-line when a fault is detected in a currently active module.

In comparison to fault-tolerant systems, fail-safe systems also have a fault coverage probability which determines the overall system safety, but this class of system is typically interested in fault detection only. A fault is considered as covered in a fail-safe system if it is detected and the system is configured to be properly shutdown. Thus, the fault coverage probability for fault-tolerant systems and fail-safe systems both include the probability that a fault will properly be detected and processed by the system. For this reason, the term fault processing is used herein to include the concepts of both fault-tolerance and fail-safe.

Previous fault injection techniques can be placed into three general categories: (1) fault injection at the hardware level on an operational prototype; (2) fault injection at the software level on an operational prototype of a fault processing system; and (3) fault injection into a simulation of the fault processing system. Fault injection has been used over the past decade to evaluate various performance characteristics of a fault processing system.

The accepted method for measuring the fault coverage of a fault processing system is the evaluation of system fault processing capability using a stochastic approach, i.e., via the random injection of faults. The general approach to these methods is to inject a fault into the system to see if the fault processing portion of the system correctly handles the fault. The apparatus under test (AUT) can be a system simulation or an operational system. These techniques, while providing insight into the behavior and types of faults that a fault processing system can sustain, lack the statistical foundation for high-reliability dependability validation. One drawback of randomly selected faults is the large probability that the injected fault will remain latent. The fault injection experiments that have a fault latency percentage of 50% or greater generally deal with transient fault injection experiments. It is well known that 80% or more of all faults which occur on ground-based computer applications are transient in nature. All of these methods view the system as a black box, and little analysis is performed to determine which faults lead to failures for the system without fault processing.

Generally, prior art fault detection methods determine fault processing system fault coverage via fault injection by using random selection of fault location, fault type, and random selection of fault insertion. A few techniques employ a Failure-Modes-and-Effects Analysis (FMEA) to determine the location of faults. Usually, FMEA is performed at a very high level and relies heavily on engineering intuition. Additionally, FMEA usually does not provide any information on the fault type or fault timing for the fault list of interest.

For fault injection to be effective in measuring the fault coverage of an ultra-reliable, life-critical fault processing system, some method for determining the location, value, and timing associated with the fault to be injected is essential. The purpose of fault injection for determining fault coverage is to inject a fault into the system which has a high probability of producing a failure in the absence of system fault processing. Specifically, the ideal injected fault should always cause a system failure if the system's fault processing is not utilized. It is believed that earlier fault injection methods have not performed this type of deterministic analysis. For validation of a high-reliability system to be feasible utilizing a fault injection technique, a method for determining the faults which lead to system failures in the absence of system fault processing is needed, so that the system can be selectively reconfigured, when possible, to improve system fault coverage.

SUMMARY OF THE INVENTION

The invention herein provides a method for selecting and responding to a malicious fault in a reconfigurable electronic apparatus that can perform multiple tasks, and that has fault processing for counteracting a class of faults which can generally cause the apparatus to fail if said fault processor is unavailable and to which class the malicious fault can belong. The reconfigurable electronic apparatus can be a fault processing system, which can be an interlocking control circuit, or a combinational circuit. The malicious fault can occurring during execution of a preselected task by the apparatus, causing said apparatus to fail during such execution. The preselected task generally is selected from aforementioned multiple tasks.

The method includes constructing an information flow representation of at least a portion of the apparatus executing the preselected task of interest; applying a preselected fault representation to the information flow representation and producing multiple input error conditions corresponding to at least one preselected output condition; selecting from the aforementioned multiple input error conditions at least one fault condition corresponding to the class of faults; injecting the at least one fault condition into the information flow representation and producing a malicious fault condition representative of said malicious fault; and modifying the apparatus responsive to the malicious fault condition, thereby counteracting the malicious fault. The malicious fault can belong to the class of faults occurring during execution of the preselected task by the apparatus and causing the apparatus to fail during such execution.

The constructing of an information flow representation of at least a portion of the apparatus executing the preselected task can include the steps of isolating the preselected task from others of the plurality of tasks; generating a simulation file representative of the apparatus executing the preselected task; and generating an information flow representation of the apparatus executing the preselected task from the simulation file.

The information flow representation can include a directed graph data structure having a plurality of nodes and a plurality of arcs. Also, the preselected fault representation can include reverse implication, which may be recursive reverse implication and which may include the step of generating a fault tree. Furthermore, the method for generating the preselected fault representation can include the step of performing a forward consistency check on selected ones of the plurality of nodes having a plurality of outputs to selected other nodes therefrom, these selected others having reconvergent fanout. Constructing an information flow representation can further include the steps of generating a simulation trace file representative of the at least a portion of the apparatus executing the preselected task of interest, and constructing from the simulation trace file a directed graph data structure having a plurality of nodes and a plurality of arcs.

The fault injecting can include the additional step of fault collapsing. Also, fault selecting can include selecting selected ones of unevaluated faults which occur earliest in time relative to others of the unevaluated faults, which selected ones can exclude latent faults.

BRIEF DESCRIPTION OF THE DRAWINGS

FIG. 4 is a portion of hypothetical simulation output file illustrative of system hardware and software states during task execution.

DETAILED DESCRIPTION OF THE PREFERRED EMBODIMENTS

Figure 1:
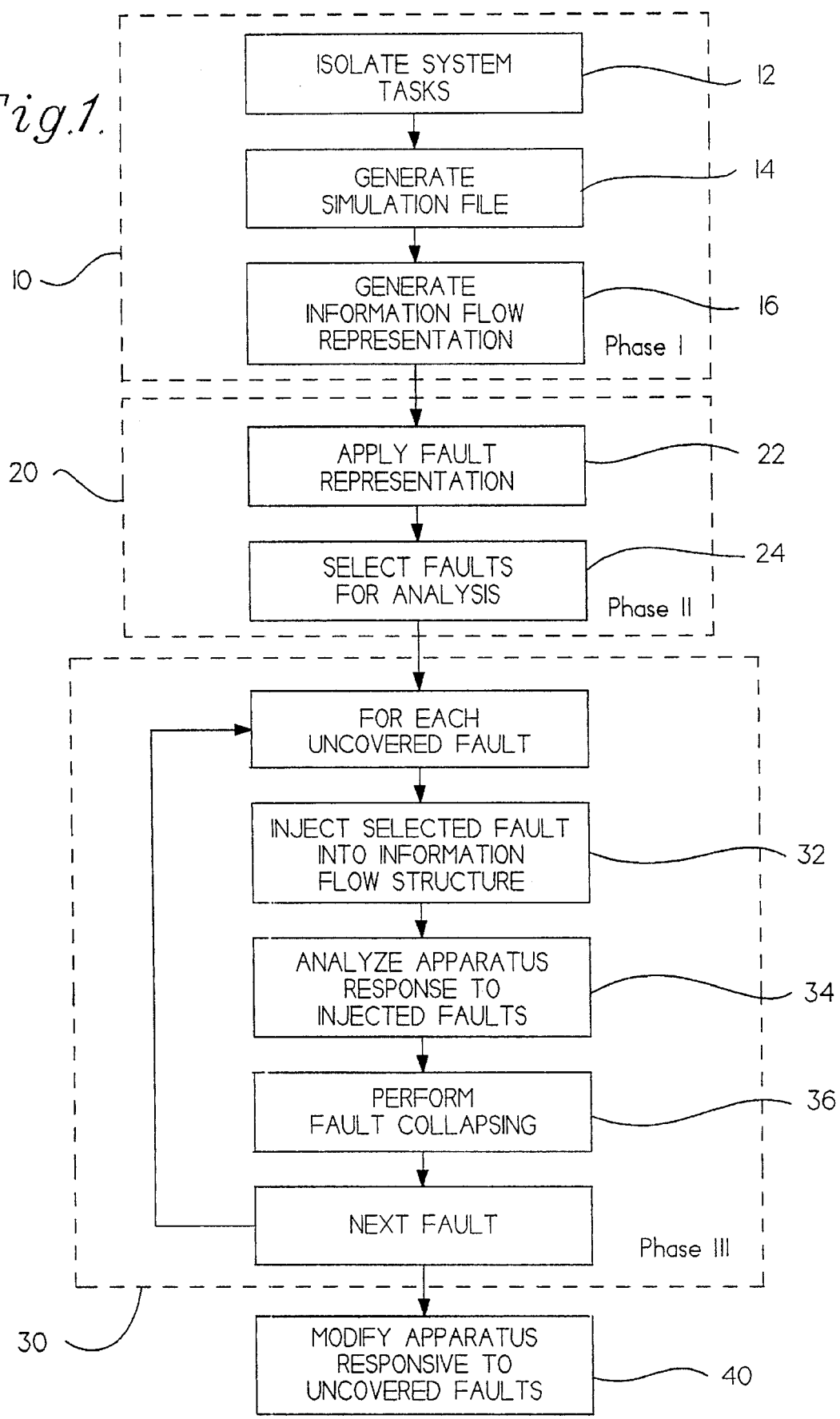
FIG. 1 is a process flow diagram of an embodiment according to the invention herein.

The present invention provides a method for selecting and responding to a malicious fault in a reconfigurable electronic apparatus such as, for example, a combinational logic circuit or a fault processing system. As used herein, the terms apparatus or system are used interchangeably and may include hardware or software. In general, it is desirable to avoid random injection of system faults because of the potentially large numbers of fault injection experiments which would use permanently inactive system faults, thus wasting system resources while adding little to apparatus characterization.

One deterministic method of eliminating the random fault injection process is maximally accelerated failure rate (MAFR) testing. There are three conditions generally required for MAFR testing: (1) no fault latency; (2) minimal error latency; and (3) maximum probability of failure. The MAFR is achieved for the test of system fault processing whenever the occurrence of a fault instantaneously produces an error condition which is guaranteed to produce a system failure, if there are no system fault detection measures employed. A fault is defined to be some defect in a software or hardware component. An error is the manifestation, or activation, of a fault. A failure is defined to be the deviation from the desired response. Not all faults cause an error, and likewise, not all errors lead to a failure. As fault processing is added to the system, the likelihood of a failure generally decreases. Ideally, fault processing will reduce failures to zero occurrences.

The terms fault processing errors and fault processing failures refer respectively to error and failure conditions which are caused by the improper processing of faults, which can be caused by a number of factors. For example, the failure to detect an error condition is one type of a fault processing error. If no other system error detection mechanisms detect a fault processing error, then a fault processing failure results. In most cases, a fault processing failure results in a system failure, that is, an incorrect system output being delivered.

Ideally, one would like to construct a fault list which fully covers all instances of failure conditions which exhibit the third MAFR condition, that is, the system is guaranteed to fail if the fault processing mechanisms of the system are deactivated. To achieve the minimum fault latency and minimum error latency requirements, one needs to determine the instant at which the injected fault is activated and produces an error. In the ideal case, there would be zero fault latency and minimal error latency. One known method for achieving this goal is to inject errors which lead to system failure in the absence of system fault processing. This type of fault injection accurately represents a transient fault which stays in the system no longer than one clock cycle and which can corrupt data.

Techniques using a Monte Carlo approach to estimate fault coverage may not be feasible to measure the fault coverage of high-reliability systems due to the potentially large number of randomly-selected latent faults which may provide no information about the system. The present invention provides a method that determines malicious faults, i.e., transient data faults that can lead to system failure in the absence of system fault processing. The fault list generated according to the method herein contains the worst-case class of faults that a high-reliability system typically can encounter. One advantage of this characterization of malicious faults is the ability to accurately estimate the fault coverage of a high-reliability system. The configuration of the system can be modified to counteract the effects of the uncovered malicious faults.

One goal of the fault injection procedure herein is to exercise a system's fault processing capabilities and to extensively test the system's fault processing capability. The method according to the invention herein provides a systematic approach for determining the type, location, and timing associated with a fault that leads to a system failure in the absence of system fault tolerance.

Referring to FIG. 1, the method, in general, includes generating an information flow representation of at least a portion of the apparatus as it executes a preselected task, step 16. Such a representation can include a data flow graph or a directed graph. The method also can include applying a preselected fault model, or fault representation, to the information flow representation to produce multiple input error conditions which can correspond with at least one output condition, step 22. In one embodiment of the present invention, the preselected fault representation is the reverse implication model. The reverse implication model can employ a simulation of the AUT at a low level, for example, where the AUT is a microprocessor, the Instruction Set Architecture (ISA) level can be used. The data flow graph then can be analyzed using fault tree analysis techniques to determine the location and types of faults which lead to a system failure in the absence of system fault processing. The method also includes selecting from the multiple input error conditions at least one fault corresponding to the desired class of faults, step 24, namely, those faults which lead to a system failure in the absence of system fault tolerance. The method proceeds by iteratively analyzing selected faults including injecting each selected fault condition back into the information flow representation, step 32, and analyzing the results to determine whether the injected fault caused the occurrence of a malicious failure, step 34. To facilitate the fault characterization process, the number of faults to be evaluated can be reduced by using the additional step of fault collapsing, step 36. Finally, response to uncovered malicious faults can be effected by modifying the apparatus response to the uncovered malicious faults, step 40.

Similarly, determining the fault coverage of a test vector for a given combinational circuit generally can be decomposed into three phases: (1) providing a description of the data flow characteristics for the combinational circuit, (2) constructing the fault list by applying a fault model to the data flow description of the combinational circuit, and (3) evaluation of the fault list by injecting selected faults into a simulation of the circuit. As used herein, the term fault coverage is used when referring to the fault coverage of reconfigurable electronic apparatus such as a combinational circuit or a fault processing system.

One presently preferred embodiment illustrated by FIG. 1, the first phase 10 in deterministic fault characterization for a reconfigurable electronic apparatus is constructing an information flow description of the AUT, as indicated in first phase 10. The first step in this method can include isolating the system tasks to be executed by the system, step 12. These tasks then can be simulated to verify error-free operation in the absence of hardware faults, and a simulation trace file then can be generated, step 14. The next step, 16, of first phase 10 is generating an information flow representation based upon the simulation trace file.

For a combinational circuit, this representation can be the actual combinational circuit itself, which can be represented as a directed graph or data flow graph. Each node in this directed graph can represent a logic gate; the incoming branches to a node can represent the input logic lines to the logic gate. Also, the output of a logic gate is represented as a branch or branches exiting a node in the directed graph. For both combinational circuits and fault processing systems, output errors can be caused by corruption of information due to a fault which affects the desired processing of information through the data flow graph.

A data flow graph can be a data structure that represents the information flow through a fault processing system and can require a high level of detail. The data flow graph needs to accurately reflect the low-level information flow through the system; for example, the information flow at the ISA modeling level. An ISA model is capable of executing system software on the simulated system. One of the major components of the ISA system model is the ISA model of the microprocessor used by the system. This ISA processor model is derived from the functional specification of the processor. Typically, this functional specification is provided by the processor manufacturer in the form of the processor handbook. The functional behavior of the processor, along with the timing information associated with the execution of software instructions, is encapsulated into the ISA processor model.

Figure 2:
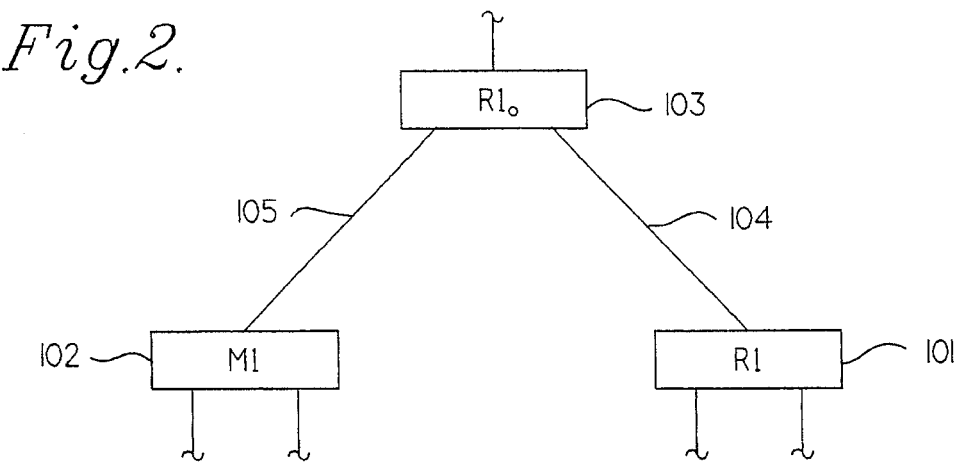
FIG. 2 is a diagram of a portion of a data flow directed graph illustrating the data flow of a hypothetical ADD instruction.

The nodes in the data flow graph can represent the memory storage locations used to store the data values which are used as operands by the program instructions. The execution of an instruction can occur on the directed arcs which connect data nodes. In general, there can be at most two data values used as input data operands for the function operation performed by an instruction, while the output of an instruction can result in one output data operand. For example, in FIG. 2, where an ADD instruction is to be executed, the input operands can be stored in register $R_1$ and memory location $M_1$ while the output operand is stored in register $R_1$. To differentiate between the input and output register operands, the output operand register is referred to as $R_{1o}$. The ADD instruction can be represented by three data nodes 101, 102, 103 in data flow graph 100. These three data nodes 101, 102, 103 represent the two input and one output data operands, that is registers $R_1$, $M_1$, $R_{1o}$, respectively. There are directed arcs leaving data node $R_1$ 101 and data node $M_1$ 102, respectively. The destination for arcs 104, 105 is data node $R_{1o}$ 103. The execution of the ADD instruction occurs symbolically as the input data operands are processed and moved from register $R_1$ 101 and memory location $M_1$ 102 with the resulting output operand being stored in register $R_{1o}$ 103. This type of data flow diagram representation 100 is a unification of software and hardware modeling at a high level of detail which allows this model to accurately reflect the dependability aspects of a fault processing system.

The data flow graph is a representation of the data flow paths and data operations through the system from the reading of inputs to the setting of outputs for some system task. Any corruption of the data path or data operations as represented by the data flow graph has the potential of creating a hazardous condition. Further analysis of this data flow graph can produce the minimum subsystem set required for safe system operation, that is, the system fault tree. This analysis is performed by utilizing a concept known as reverse implication. The fault tree itself is a representation of the minimum set of faults which produces a failure event.

Figure 3:
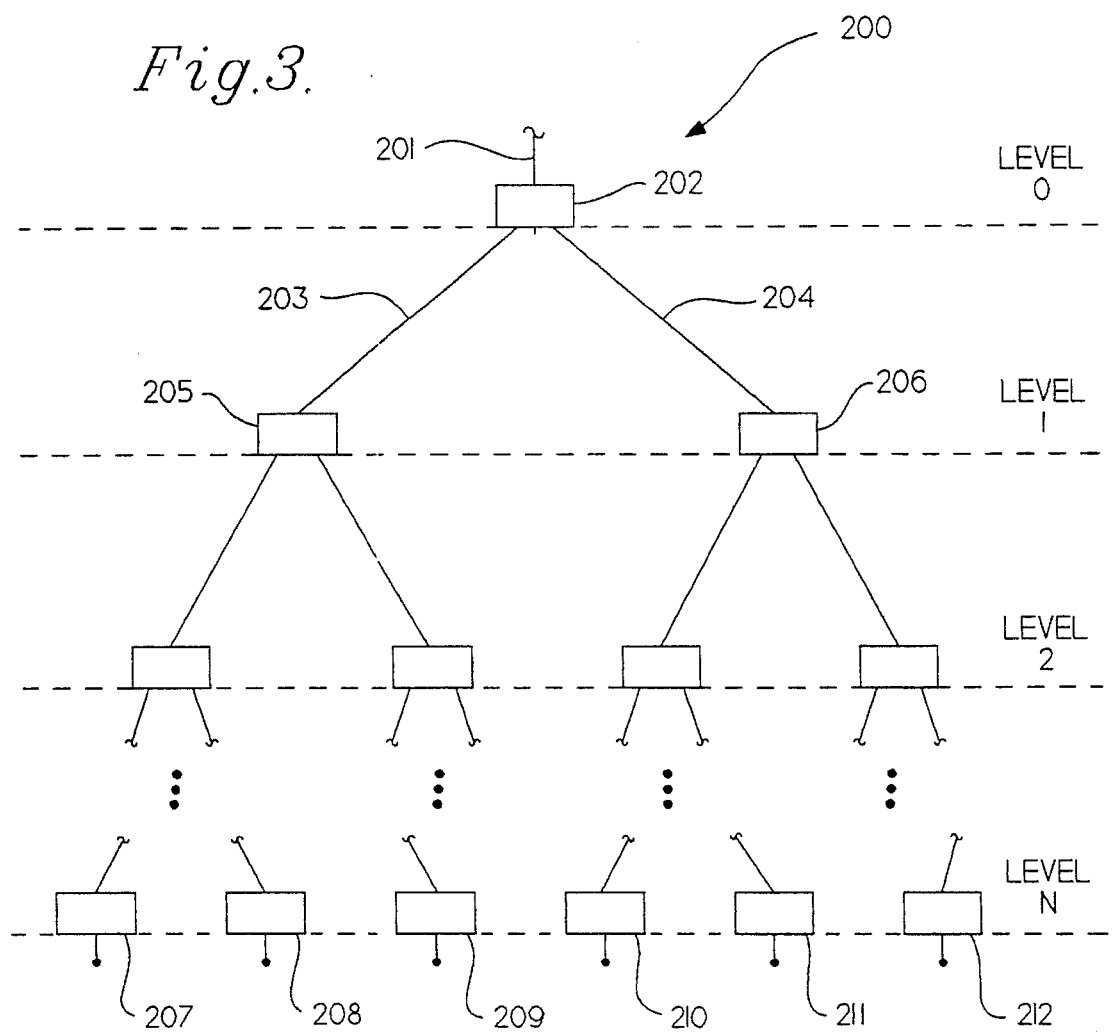
FIG. 3 is a diagram of a generic N-level data flow directed graph illustrative of reverse traversal through time and event.

As illustrated in FIG. 3, top event 202 of the data flow graph is the production of system output 201 for some system task. The system operation which produced this output must depend on some intermediate data values stored in the system. The system operations which set these intermediate data values 203, 206 are the branches 203, 204 to top event 202. Top event 202 is labeled as level 0 of data flow graph 200, while operations 203, 204 required for the first layer of intermediate values 205, 206 are labeled as level 1 of data flow graph 200. This reverse traversal through time and events within the system, or reverse implication, to construct the data flow graph levels 2 through N ends when the reading of the system input event 207–212 for the system task of interest occurs.

A simulation of the system model beginning with the reading of the system inputs and ending with the setting of the system outputs for a system task can be used. The simulation output contains the signal values along with timing information of the following: all registers utilized during the simulation; all memory locations accessed during the simulation; all instructions used by the CPU during the simulation; and all bus accesses made during the simulation. The top critical event for this data flow graph is the setting of the system outputs for the system task of interest.

After the simulation run of the apparatus executing the desired task is generated, the run is searched for the processor instruction in the Instruction Register (IR) which set this output value. The data required for this operation is tagged as the first branches in the system data flow graph. The simulation output is then searched for the instruction that set each branch data value to continue the construction of the data flow graph. The data flow graph construction is complete when the instruction which reads the input into the system is encountered.

A hypothetical simulation output file can be found in FIG. 4. The first column in data structure 250 represents the simulated time reference for signal changes. The "-" in each column denotes a don't care condition from a data flow diagram construction viewpoint. Conversely, the "*" indicates the value stored in this memory element is part of the system data flow graph. Note that, in an actual simulation, IR output would have binary values instead of these symbols. This symbolic notation is included to assist in illustrating the structure of the simulation output and how this data is viewed by the data flow graph construction process. All other data columns contain 4-bit binary numbers. Note that this simulation run ends shortly after the system outputs are set. The system output in this example has a memory mapped I/O structure. The register $R_{out}$ is the output data register for the system task of interest.

The first instruction listed in FIG. 4 is an AND operation beginning at 3950 time units. The results of this operation are stored in register $R_x$ starting at 4000 time units. The next operation of interest is the MV instruction at 4190 time units which moves the data stored in memory address 1AEF (HEX) to register $R_2$. The MOVE (MV) instruction is completed in 10 time units. At 4500 time units an ADD instruction occurs. The data in registers $R_x$ and $R_2$ are summed, and the result is stored in register $R_1$. The ADD operation is finished at 4600 time units. The next to last instruction of interest is the MV operation at 4640 time units. The EXCLUSIVE-OR (XOR) instruction at 4900 time units is the final operation of interest. This operation sets the output register $R_{out}$ at 4950 time units by performing an XOR on the values stored in registers $R_1$ and $R_2$.

Figure 5:
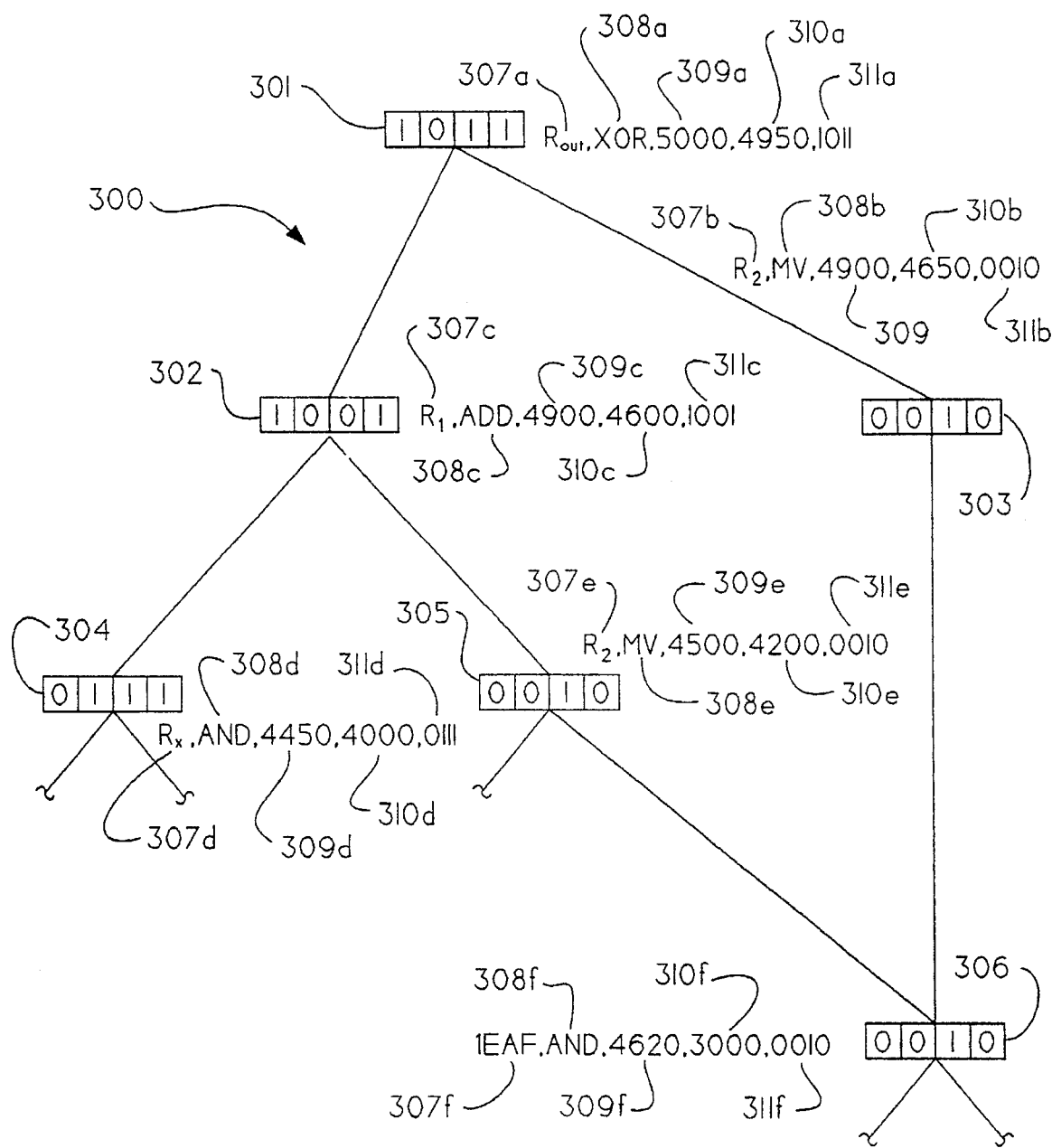
FIG. 5 is a diagram of a data flow directed graph constructed from the simulation output file in FIG. 4.

The data flow graph 300 for the simulation depicted in FIG. 4 is illustrated in FIG. 5. The $R_{out}$ register 301 represents the 0 level for this diagram. The intermediate data values that this top level event relies on are stored in the $R_1$ and $R_2$ registers 302, 303, respectively. These registers 302, 303 represent the 1st level of the data flow graph. Likewise, the 2nd level is composed of the registers $R_x$, 304 and $R_2$, 305, while the 3rd level consists of a single memory storage location 306 at 1AEF (HEX). Each level in this data flow graph represents data nodes which have approximately the same data load start time.

The processor instruction, along with timing information, is stored in the nodes 301–306 of the data flow graph. The node information can consist of five items. The memory location of the data can be stored in the first field 307a–f. If the memory address maps to a memory-mapped I/O device, then the symbolic name for the device can be stored in the address field. The second field 308a–f can be the instruction that places the data in this storage location. The third field 309a–f can store the final time that this value is needed by the system, while the fourth field 310a–f can indicate the start time for the data residing in this memory location. This final time value stored in the third field 309a–f can, and often times does, differ from the time at which this memory value is changed. Thus, a corruption of the data after this time period does not produce an error in the system data path. The fifth field 311a–f stores the data value of the memory device.

Referring back to FIG. 1, the second phase 20 in the deterministic fault characterization is determining the faults of interest for a given data flow graph. In general, the first step is applying 22 a preselected fault representation and generating a fault list thereby. The fault list can be in the form of a fault tree. Selecting 24 faults for analysis can reduce the number of faults, particularly permanently latent faults, to be analyzed. Each of the simulations can be analyzed to determine the types of faults, along with the fault window of opportunity (timing information), that produces a task output error if the system's fault processing is deactivated.

In general, a fault window of opportunity specifies the time interval during which a given fault location and fault type can produce essentially the same malicious behavior in the AUT. Using the example where a memory location holds the value AA (hex) for 1,000 to 2,000 time units in a data flow diagram node, the reverse implication process can be applied to the data flow diagram to produce the erroneous value A0 (hex), which is the transient, or malicious, fault associated with this node. In this example, the fault window of opportunity between 1000 and 1999 time units. Ideally, any transient fault that occurs during this time window and that produces the erroneous value A0 (hex), also produces the malicious behavior of interest.

The fault list of interest for a combinational circuit is determined by evaluating the data flow graph for a given fault model or representation. Typically, the fault models of interest for a combinational circuit is the stuck-at-1 and stuck-at-0 signal line fault model. The fault list is generated on a combinational circuit by traversing the data flow diagram and marking each branch for two fault conditions: a stuck-at-1 fault and a stuck-at-0 fault. Thus, for a combinational circuit there are 2b faults in the fault list of interest, where b is the number of branches in the directed data flow graph.

A similar method can be used for constructing the fault list of interest for a fault processing system. The fault model used in this technique, however, may not be the stuck-at fault model. Instead, an Instruction Set Architecture (ISA) fault model can be used for the construction of the fault list of interest. The fault list of interest for a fault processing system can be constructed by assuming a system output error condition which is a failed output. This error condition then can be propagated backwards through the system in both hardware and time, using the reverse implication process fault representation. This reverse implication process is applied to the apparatus information flow representation. The concept of reverse implication is based on the inverse functional mapping of a node in the data flow diagram.

In general, the faults selected by reverse implication are arranged in a system fault tree. This fault tree contains information such as fault location, fault type, and timing information associated with all single faults in the system which produce the assumed unsafe system output error condition. The fault tree, then, represents those faults whose fault conditions are likely to lead to a system failure in the absence of system fault processing. The determination of the faults of interest (that is, the fault list to be used for fault injection) can be accomplished by applying a fault representation to each node and branch in the data flow graph. In the embodiment employing an ISA model, the ISA fault model can be introduced before the fault tree construction method. This ISA fault model is then applied to each node of the data flow graph. The faults determined by this process can be stored in a modified fault tree format.

Figure 6:
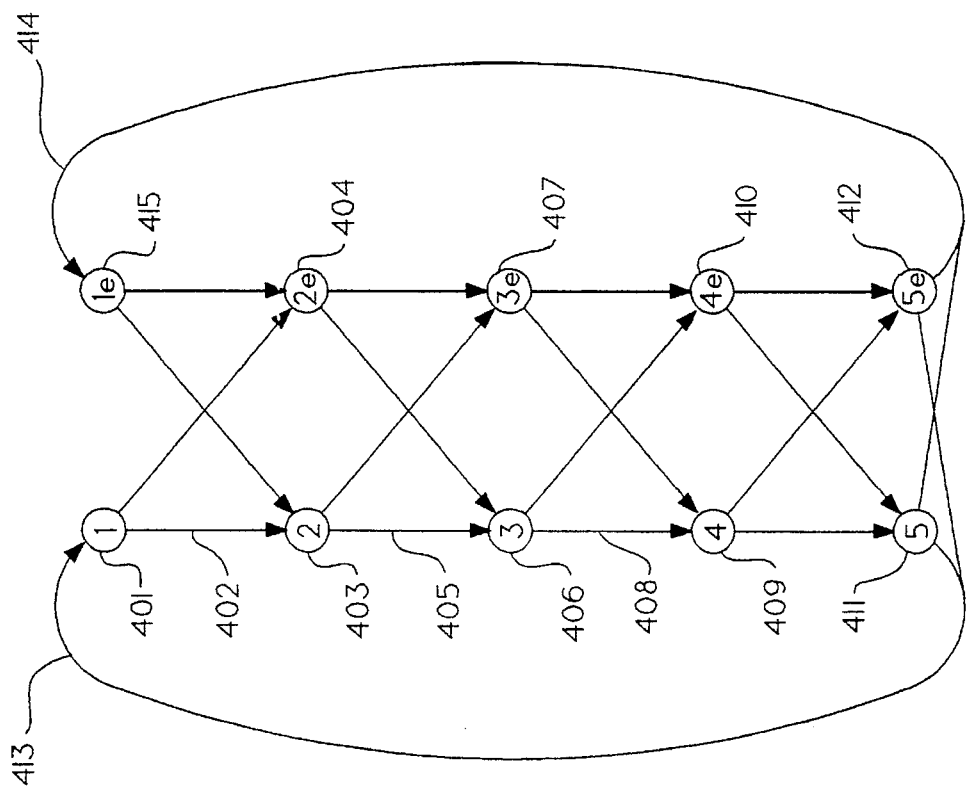
FIG. 6 is a diagram of a general ISA fault model for a microprocessor instruction set.

The purpose of a fault representation, or model, is to model the faults which occur in the real world operation of the system. For a fault model to be usable, it should represent the majority of faults that are of interest. The original motivation for this exploration into the failure modes of a microprocessor was to develop ISA tests from the microprocessor's own instruction set to test for the correct operation of the processor. FIG. 6 represents an ISA fault model 400 for a microprocessor instruction set. Table 1 describes the operations related to the states in FIG. 6.

TABLE 1

| STATE | DESCRIPTION | STATE | DESCRIPTION |
|---|---|---|---|
| 1 | correct PC value | 1e | faulty PC value |
| 2 | successful instruction fetch and decode operation | 2e | faulty instruction fetch and decode operation |
| 3 | complete additional data fetches | 3e | faulty additional data fetches |
| 4 | completed data processing | 4e | faulty data processing |
| 5 | completed data storage | 5e | faulty data storage |

The instruction cycle begins in state 1, 401, with the correct value of the program counter (PC) for the instruction which is to be executed. The fetch and decode operation for the instruction is performed next, represented as an arc 402 leaving state 1, 401. If no fault is encountered, the instruction cycle moves to state 2, 403, else state 2e, 404, is entered. The next operation 405 performed is any additional memory accesses required due to indirect addressing modes. The fault-free execution of these additional fetches results in the entering of state 3, 406. A fault in these additional fetch cycles results in the entering of state 3e, 407. The data processing portion of the instruction cycle is encountered next. Fault-free operation 408 of this portion of the instruction cycle results in reaching state 4, 409, of the state diagram shown in FIG. 3. If a fault is present in the data processing cycle, state 4e, 410, is entered. The storage of the processed result is encountered next. Correct and faulty operation of this portion of the instruction cycle results in the entering of states 5 411 and 5e 412, respectively. The last portion of the instruction cycle is the adjustment of the PC to the address of the next instruction to be executed. Correct adjustment 413 of the PC results in the entering of state 1 401. Conversely, the incorrect adjustment 414 to the PC results in the entering of state 1e 415.

The ISA fault model presented in FIG. 6 is general in nature, therefore, not all instructions will execute all of the instruction cycle stages represented in this model. An instruction cycle stage is represented by an arc connecting two states in this ISA fault model. The arcs representing the instruction cycle stages which are not executed by these instructions are traversed in zero time. Additionally, these nonexecuting instruction cycle stages cannot result in the entering of a fault state for the nonexecuting instruction cycle stages. Generally, this restriction is imposed because the nonexecuting instruction cycle stages functionally are not in the instruction itself.

Several assumptions can be made in the ISA fault model. Once a fault becomes active in an instruction cycle, it can be assumed that the remaining instruction cycle stages in the instruction are executed. This is not to imply that these remaining instruction cycle stages are executed in an error-free fashion. It is likely that an activated fault which produces an error in a previous fault model state will result in an error in one or more remaining fault model states in the instruction cycle. If the instruction does not completely execute, that is, the processor ceases to operate, then the fault and resulting failure can be modeled by entering and remaining in an ISA fault model state.

The ISA fault model can allow for the multiple activation of a fault and/or faults during the execution of a single instruction cycle. For example, where a fault occurs on an address line of the processor bus while the processor is in ISA fault model state 5, 411. Depending on the type of address fault, that is, stuck-at-1 or stuck-at-0, the position of the fault on the address bus, and the correct value of the address line, determines whether ISA fault model state 1, 401, or 1e, 412, is entered. This same three-stage criteria determines whether state 2, 403, or 2e, 404, is entered from state 1/1e, (401/415). In fact, this three-stage criteria can be applied to every ISA fault model state which accesses the processor bus. These memory access states are: 1, 2, 3, and 5 (reference numbers 401, 403, 406 and 411, respectively). The possible ISA state transitions for this address fault scenario are: 1/1e, 2/2e, 3/3e, 4, 5/5e, and 1/1e (reference numbers 401/415, 403/404, 406/407, 409, 411/412 and 401/415, respectively). Thus, there are 32 allowable state transition sequences for this example.

An internal processor fault may cause the most general fault activation sequence to occur. The allowable state transitions for the most general case are: 1/1e, 2/2e, 3/3e, 4/4e, 5/5e, and 1/1e (respectively, reference numbers 401/415, 403/404, 406/407, 409/410, 411/412 and 401/415). For this general case there are 64 allowable state transition sequences.

A fault tree is typically comprised of subsystems. Each of these subsystems generally has a known probability of operation as a function of time, that is, a known reliability time function. The reliability of the top event in the fault tree can be calculated based on the reliability of the sub-systems through various analytical techniques. A fault tree is constructed for a fault processing system by finding the data flow paths which allow an erroneous condition caused by a fault to propagate to the system output.

One technique for determining these fault paths can be to assume an erroneous output and perform reverse implication. Reverse implication is the process of determining the inputs of a logic block based on its current output value. For example a 1 (one) on the output of an AND gate implies that all inputs of the logic gate are 1 (one). Conversely, a 0 (zero) on the output of an OR gate implies that all inputs to the gate are 0 (zero).

As an aid to understanding, the reverse implication process can be expressed in a formal mapping notation. For example, a given logic function can be described as $$y = F(X) \tag{1}$$

where y is a single output of the logic block, F(●) is the functional map of the logic block, and X represents the input vector to the logic block with n elements. The reverse implication process consists of logically inverting y and then determining which positions in a specific input vector $X_i$ when logically inverted produce this incorrect output. For discussion purposes, only a single position in the input vector is allowed to be incorrect. Thus, there are 2n possible stuck-at faults to consider during the reverse implication process. In mapping terms $$\bar{y} = F(X_{i_e}) \tag{2}$$

where $$X_{i_e} = \{x_1, \ldots, x_{i-1}, \bar{x}_i, x_{i+1}, \ldots, x_n\} \forall i \in \{1, 2, 3, \ldots, n\}.$$

Thus, reverse implication is the inverse mapping of the erroneous output of a Boolean function to a single input line error condition for a given input vector $X_i$. For some $F(\bullet)$ and $X_i$ there exists no single input error condition which maps to the output error condition.

This single-bit reverse implication handles the single-bit errors caused by the ISA fault model. However, this reverse implication process must be extended to cover the multiple bit errors produced by addressing and data processing faults in the ISA fault model. The execution of an instruction that uses two data values can be thought of as a functional mapping from inputs to outputs. The ISA model utilizes this functional mapping concept to produce the desired output from each instruction. This mapping can be expressed by $$Y = F(X_1, X_2) \tag{3}$$

where Y is an output vector with n elements, $F(\bullet)$ is the input to output function, $X_1$ and $X_2$ are the two input vectors, each of which contains n elements. The inverse functional mapping to determine $X_1$ given Y and $X_2$ is $$X_1 = F_1^{-1}(Y, X_2) \tag{4}$$

where $F_1^{-1}(\bullet)$ is the inverse function.

The error condition for the output of the instruction is $$\in_o = Y_e - Y \tag{5}$$

where $\in_o$ is the error expressed as an arithmetic difference, Y is the correct instruction output, and $Y_e$ is the erroneous system output. Reverse implication for this arithmetic difference is accomplished in much the same fashion as single-bit reverse implication. The erroneous output $Y_e$ is assumed and then the arithmetic difference on the first input vector that causes the output error is calculated by using the inverse specified by Equation 4 to yield $$X_{1e} = (X_1 + \in_{X_1}) = F_1^{-1}(Y_e, X_2) = F_1^{-1}((Y + \in_o), X_2) \tag{6}$$

where $X_{1e}$ is the implied erroneous input and $\in_{X_2}$ is the arithmetic difference between $X_{1e}$ and $X_1$. This same process can be applied to the second input vector $X_2$, assuming that the inverse functional mapping to determine $X_2$ given Y and $X_1$ exists. Applying reverse implication results in $$X_{2e} = (X_2 + \in_{X_2}) = F_2^{-1}(Y_e, X_1) = F_2^{-1}((Y + \in_o), X_1) \tag{7}$$

where $X_{2e}$ is the implied erroneous input and $\in_{X_2}$ is the arithmetic difference between $X_{2e}$ and $X_2$, and $F_2^{-1}(\bullet)$ is the inverse functional map to determine $X_2$ given Y and $X_1$.

During the construction of a fault tree, a forward consistency check can be required if the value stored in the next lower level of the data flow diagram has multiple paths to the next higher layer, that is, the lower level has reconvergent fault. Memory element 1AEF, 507, displayed in FIG. 7 has this property. When the reverse implication process of a reconvergent fanout memory location indicates that a bit or bits should be changed, then this erroneous value should be propagated upward through all the upward paths specified by the reconvergent fanout data flow graph node toward the top-level event of the data flow graph, that is, the root node of the data flow graph.

Figure 7:
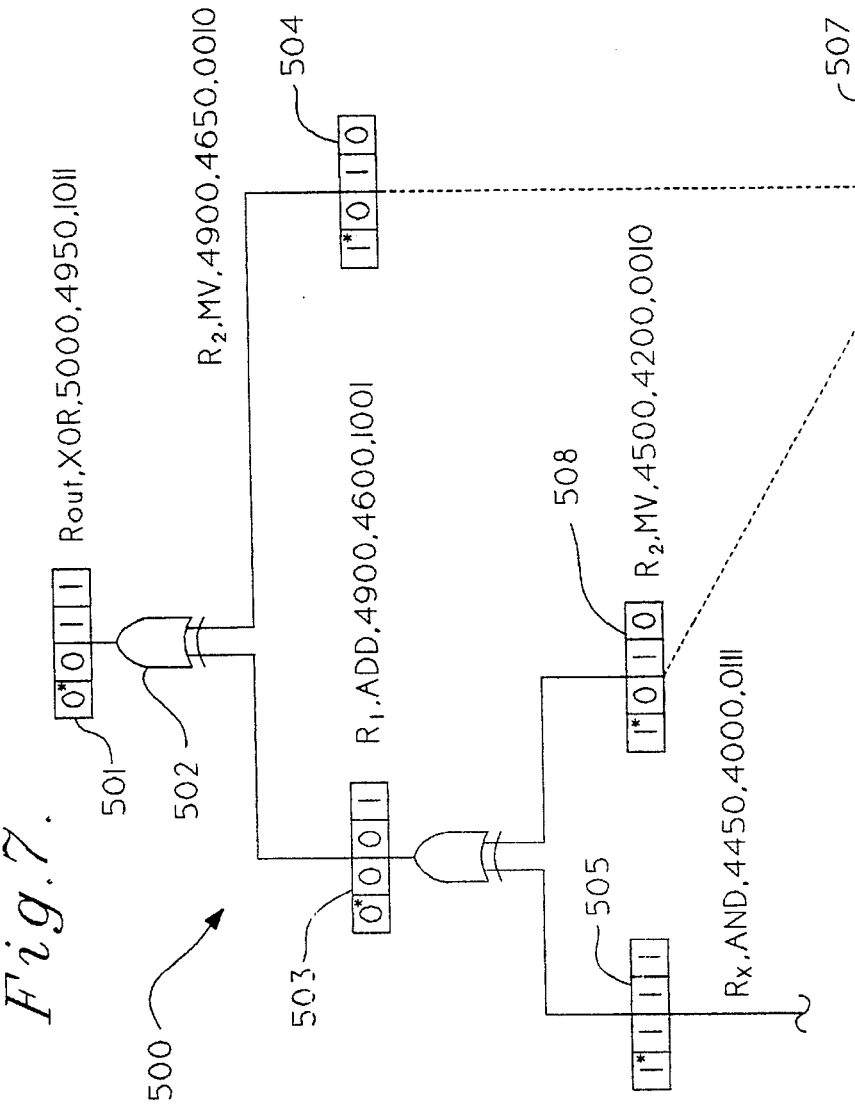
FIG. 7 is a diagram of a reverse implication fault representation.

A reverse implication fault representation 500 is illustrated in FIG. 7 and is based upon data flow graph 300 in FIG. 5. The reverse implication process can begin by selecting an erroneous condition in $R_{out}$ 501, such as an incorrect bit in the system output. For example, assume the most significant bit in $R_{out}$ 501 is changed from a 1 to a 0. Using reverse implication on the XOR operation implies that an error has occurred in either the most significant bit of register $R_1$ 503 or $R_2$ 504. Since there are two possible faults that can cause this output error, one must choose which path to reverse imply. This decision operation is represented as an XOR fault tree gate 502 in FIG. 7. The $R_1$ register 503 then can be selected. The most significant stuck-at-0 bit error in this register can be caused by either a most significant bit error in either level-two $R_x$ 505 or $R_2$ 508. Again, a decision must be made on the propagation path. In FIG. 7, the inclusion of another XOR fault tree gate 506 can be used to represent this decision process. Register $R_2$ 508 is reverse implied to the memory element 1AEF (HEX) 507. Memory element 507 is a reconvergent fanout node because it provides input to more than one operation at the next higher lever. The path on the right 508 of the data flow graph must be forward implied to first-level-one register $R_2$ 504. Forward implication may also be called forward consistency check. This value, along with the erroneous value stored in register $R_1$ 503, is evaluated via XOR operation 502. This new output is compared with the original nonerroneous data value. For this case, these two values match. Therefore, the original error condition is not possible with memory element 1AEF (HEX) 507 having the required reverse implication error value. Conversely, if the original error was present after XOR operation 502, then memory element 1AEF (HEX) 507 is marked as a valid error condition. As a result of forward implication, the fault tree branch of the data flow graph terminates at the level-one register $R_2$ 504 and the level-two register $R_2$ 508. The only path remaining to reverse implicate in this partial fault tree diagram is the level-two register $R_x$ 505.

Referring back to FIG. 1, the third phase 30 of deterministic fault characterization according to the invention herein is the injection of the selected faults into the system as described in the information flow representation. At step 32, selected faults are then injected at the appropriate point in time, that is, the fault window of opportunity, into the system task simulation on a single fault per simulation run. These simulation runs are analyzed at step 34 to determine if the system's fault processing methods properly process the fault. The faults which are not properly handled by the system are saved and further analyzed at step 34. After this fault injection analysis process at step 34 is complete for each system task, the probability of a fault being properly processed by the system can be calculated for each specific task. The faults which were not covered at the task level are reinjected into a complete system simulation. This complete system simulation is performed because a later task may detect the fault from a previous task and provide the desired fault detection.

For a combinational circuit, a fault can be injected into a desired branch in the directed graph and then the input test vector can be applied. The Boolean expressions stored in each node of the directed graph can be evaluated whenever all of the branches entering a node have a digital logic value. The output of the graph is observed to determine if an error condition is produced. The injected fault is considered to be covered for a combinational circuit if an erroneous output is produced. The occurrence of the output error can be directly attributed to the injected fault. If this fault were to occur in an actual circuit, the applied test vector could detect the fault due to the erroneous output produced.

Fault processing system fault coverage is an extension of the combinational fault coverage. A fault processing system can be designed to remove from the system the erroneous value produced by a fault. This removal of the error condition allows the system to produce substantially error-free output and also potentially be reconfigured to remove the fault condition. This differs from combinational circuit fault coverage because for a fault to be considered covered by a combinational test vector, the fault must produce an erroneous output condition. A set of input test vectors provides 100% combinational fault coverage when the faults associated with every branch in the data flow graph description of the combinational circuit are covered. The fault coverage for a given data flow graph is considered to be 100% if all single fault conditions which lead to system failure in the absence of fault processing are properly processed by the system's fault processing methods.

The fault tree consists of implied error paths in the data flow diagram. There can be a strong correlation between the implied error paths in the fault tree and a sensitized path in a digital logic circuit. A sensitized path in a logic circuit is the path on which an error propagates through the circuit to a primary output. The main difference between these two error paths is the timing information associated with the fault tree, that is the specific window of opportunity that a fault has to become active in order to propagate an unsafe error condition. In a combinational digital logic circuit, a fault on the sensitized path is always assumed to produce an output error. This basic distinction is due to the sequential nature of the system that the fault tree represents.

The fault tree of the fault-free simulation output provide an essentially complete list of faults which corrupt data such that a hazard will result in the absence of any system fault processing. Once the fault list of interest is constructed the faults should then be injected into the system to determine if the fault causes an output hazard. The overall objective of this fault injection process is to determine the faults which are covered by the system's fault detection mechanisms.

A simulation run consists of the injected fault and the system task of interest including the operation of built-in hardware and software self diagnostics routines. Once the task's built-in diagnostics provide the necessary fault location, fault containment, and fault reconfiguration to ensure continued safe operation, then the process should be repeated for the next fault in the fault list. This component selection, fault injection, and simulation process can be repeated until the hardware/software component list is exhausted.

A fault injection experiment is performed by injecting a fault and monitoring the system fault detection mechanisms. The fault detection technique employed is typically implementation specific. An injected fault, if detected by software, for example, will cause a fault handling software routine to be executed. To determine if the injected fault is detection in an ISA fault model, the program counter (PC) of the fault-free simulation run can be compared to the fault injection simulation run. If the PC columns for both the fault free and faulty simulations match, and the output of the faulty simulation contains an erroneous result, then the injected fault is considered to be uncovered for the simulation run. Likewise, all faults on the branch of the fault tree which is traversed are also uncovered. Conversely, if the PC of the two simulation runs different and the system takes the appropriate action to contain the fault and reconfigure the system, then the fault, along with all the faults on the branch of the fault tree which is traversed, is covered. The uncovered faults are marked for further evaluation in a later simulation run. This fault injection process is continued for all faults of interest that are contained in the fault tree.

The fault tree analysis can be carried out on a system task by task. For each task executed by the system, a fault tree analysis for a given set of realistic inputs can be performed. Once this fault tree is constructed, the fault injection experiments can be performed to determine which faults are covered by fault processing techniques in the task itself. All of the uncovered faults are marked and saved for further additional simulation. The next step in this process is the selection of another set of inputs for the task of interest and the fault tree/fault injection experiment process is repeated. This input selection injection 32 and analysis process 34 continues until either all of the input combinations to the task have been evaluated, or the coverage of the task being analyzed is deemed to be sufficient.

Each task in a system may be exhaustively tested to determine the fault processing coverage of the specific task. The tasks are evaluated in this separate fashion where possible because of the smaller amount of simulation resources required for a single task versus a complete system simulation. This hierarchical approach to testing is presently employed in the testing of digital systems for correct operation during the manufacturing process. The exhaustive testing of each hierarchical module is commonly referred to as pseudoexhaustive testing. This term implies that each module included in a system has been exhaustively tested. The complete system, however, is not exhaustively tested because of the inordinate amount of time required. For example, to exhaustively test just the memory of a system with 16 MB of memory could take years. The underlying assumption behind pseudoexhaustive testing is that if one can be satisfied that each module in a system is working correctly and that the control logic which controls the modules along with the interconnecting data lines is working properly, then the system is operating in the desired fashion.

This injection process of uncovered task faults can continue until all uncovered task faults are evaluated. When this injection process is complete, the overall system coverage of faults can be determined. This system level coverage is simply the number of injected faults which are covered divided by the total number of faults injected. These numbers represent all of the tasks that have been exhaustively tested, that is, the total number of faults contained in all of the fault trees for each specific set of inputs for each specific task. Stating this in mathematical form yields $$C = \frac{\sum_{i=1}^{k} \left( \sum_{j=1}^{\delta_i} n_{cij} \right)}{\sum_{i=1}^{k} \left( \sum_{j=1}^{\delta_i} n_{fij} \right)} \qquad (8)$$

where C is the overall system fault processing coverage value, k is the total number of system tasks, i is the index for the system tasks, $\delta_i$ is the number of input combinations that were evaluated for each task, j is the index for the input condition applied for a specific task, $n_{cij}$ is the number of covered faults for a given input to a specific task, and $n_{fij}$ is the number of faults in the fault tree that were evaluated for a given input to a specific task.

This approach can effect the reduction in the number of simulation runs required due to fault collapsing, that is, step 34 in FIG. 1. In general, fault collapsing is the process of determining those faults which can provoke equivalent responses by the AUT. Typically, the structure of the AUT must be analyzed to determine which faults can be considered to be equivalent, so that fault collapsing can be employed. For a combinational circuit, the gate-level model of the AUT is usually analyzed. For fault processing systems, the data flow diagram is usually analyzed.

Figure 8:
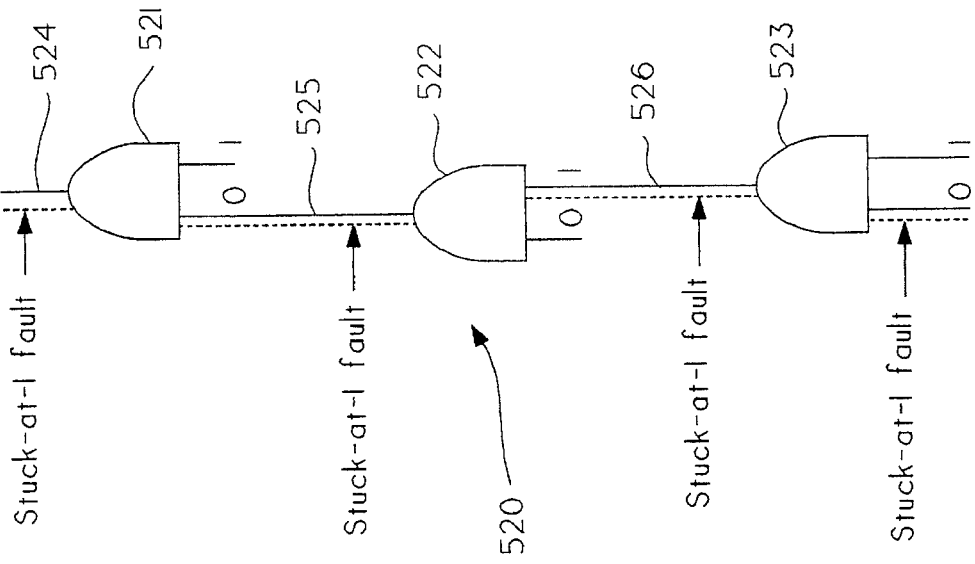
FIG. 8 is a fault tree illustrative of normal, error, and collapsed fault branches.

FIG. 8 illustrates fault collapsing for a simple combinational circuit 520 which consists of three AND gates 521, 522, and 523. The stuck-at-logic 1 fault condition can be provoked on output 524 of AND gate 521 by one of three equivalent stuck-at-logic 1 faults on gates 522 and 523. That is, if input 527 to gate 523 becomes stuck-at-logic 1, the fault will propagate to output 524, and can thus be considered as equivalent to the fault on output 524. Similarly, a stuck-at-logic 1 fault on either of lines 525 or 526 can also provide a stuck-at-logic 1 fault at output 524, and can thus be considered to be equivalent. The occurrence of any of the four equivalent faults in FIG. 8 provokes an erroneous output of logic 1 for a given input pattern which may include an actual value of logic 0 on at least one of inputs 525, 526, and 527. The analysis of the fault tree for a fault processing system can produce the fault collapsing attribute of interest.

Figure 9:
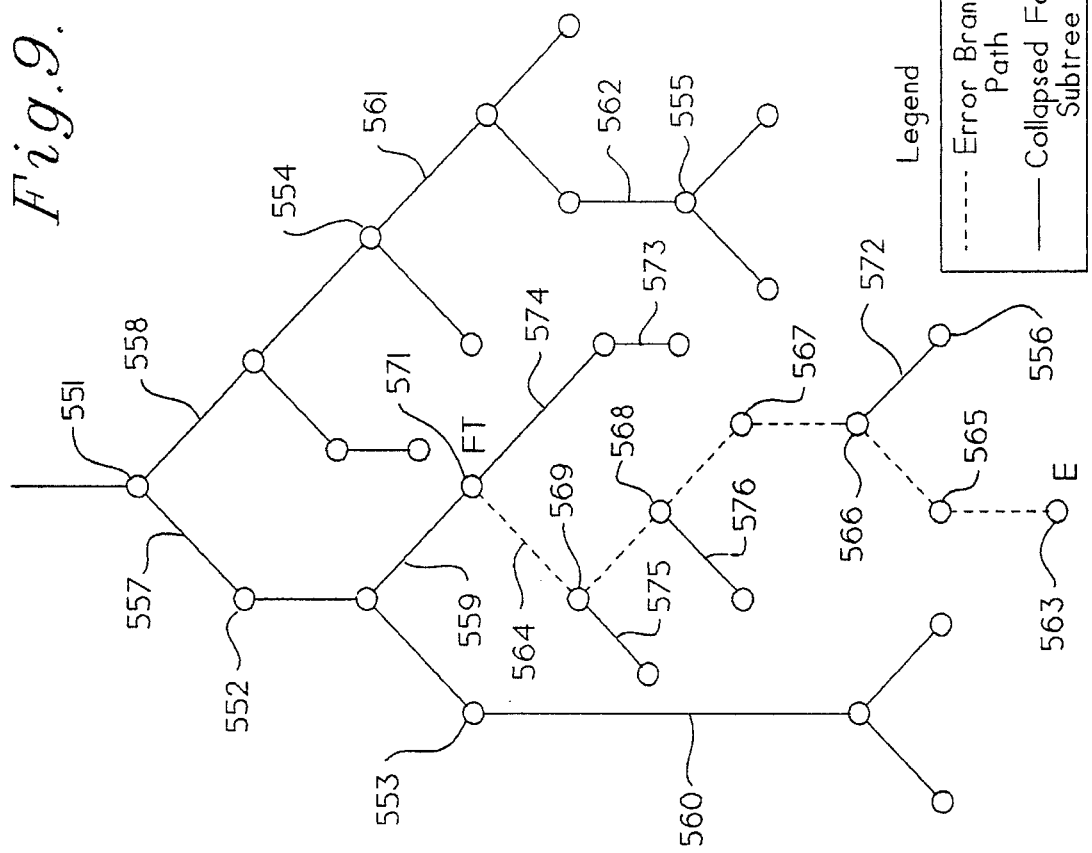
FIG. 9 is a diagram of a fault tree with fault collapsing.

An example of a fault tree with fault collapsing is illustrated as FIG. 9. The nodes in this fault tree, for example 551–556, represent fault tree logic gates and the program memory storage locations while the branches of this graph, for example 557–562, represent the propagation error path of the individual fault conditions. The fault of interest is injected in fault node E 563 of this diagram. The propagation error path for the injected fault is shown as a dashed line, 564, in FIG. 9. The nodes 565–569 on dashed line 564 represent the equivalent faults which are collapsed and represented by a single fault. The fault collapsing is possible since all faults on path 564 produce the same detected error. Error path 564 ends at fault node FT, 571, in FIG. 9. After this node, the system's fault processing mechanisms detect the error, contain the error, and may reconfigure the system to eliminate the fault. The entire fault subtree can be collapsed if there is no fault detection contained in the subtree. Collapsed subtrees 572–576 are also depicted in FIG. 9.

Once the malicious faults of interest are identified, the apparatus may be reconfigured, as shown at step 40 in FIG. 1, to minimize the effects of, if not eliminate, uncovered faults including previously unidentified malicious faults, and other malicious faults which can cause the apparatus to fail in the event the apparatus fault processor is suspended or disabled. Depending upon the nature of the malicious fault, hardware or software, or both, may be reconfigured.

Figure 10:
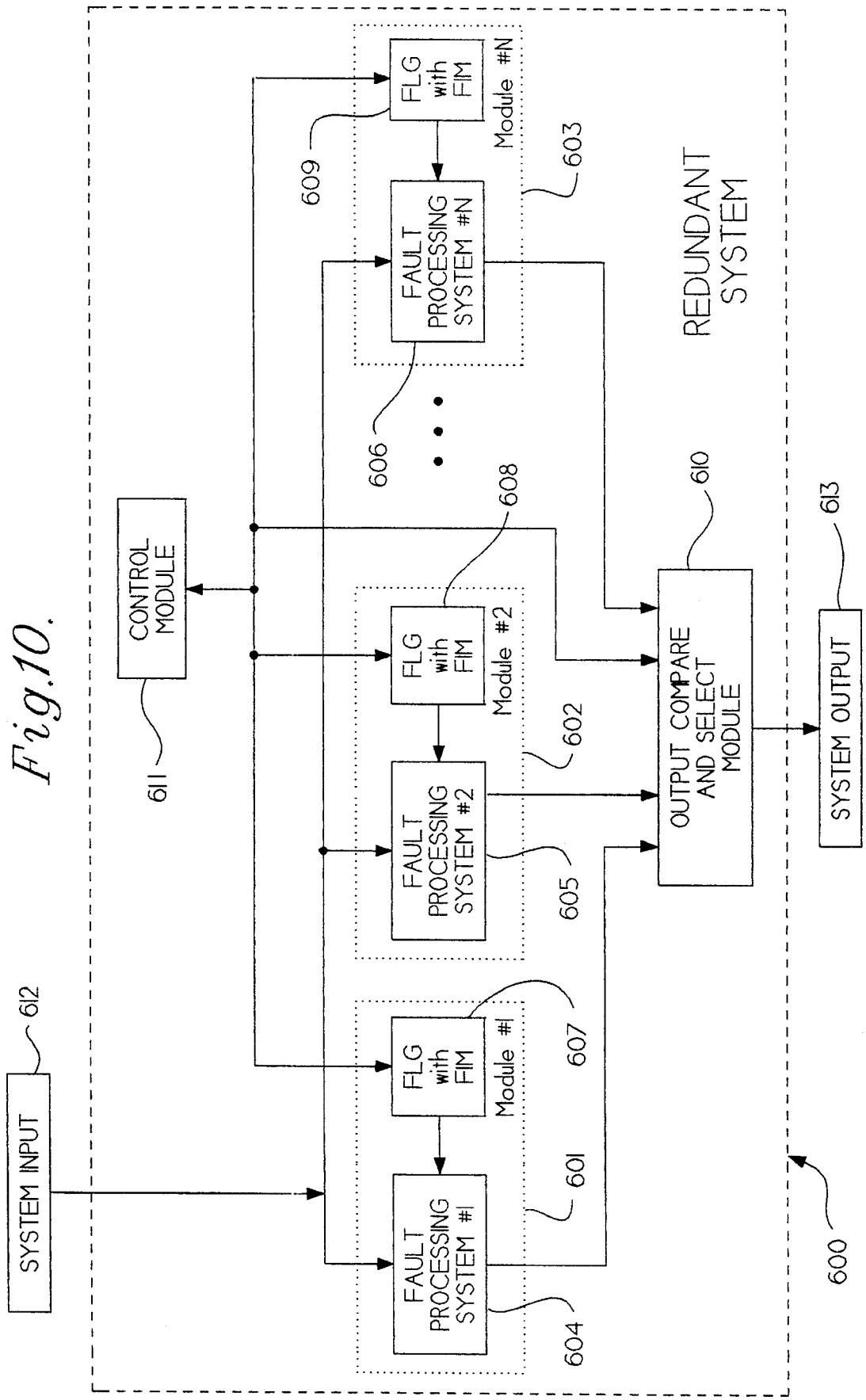
FIG. 10 is a diagram of an alternate embodiment with a self-test.

As indicated at step 40 in FIG. 1, the method according to the invention herein can include modifying the apparatus responsive to uncovered faults during the malicious fault detection process. FIG. 10 illustrates the dynamic reconfiguration of redundant system 600. System 600 can have a plurality of functional modules 601, 602, 603, each of which including respective fault processing system 604, 605, 606 and a respective fault analysis module 607, 608, 609. The architecture of system 600 can further include an output compare and select module 610 and a master control module 611.

In system 600, each of modules 601, 602, 603 typically are designed to be functionally identical, for example, redundant movement control systems which operate a ground- or space-based vehicle. System input 612 transmits data in parallel to modules 601, 602, 603, which data is received by each of fault processing systems 604, 605, 606.

Before a new output is calculated and provided to system output 613, each functional module 601, 602, 603 can be evaluated be respective fault analysis module 607, 608, 609. Each of modules 607, 608, 609 can employ the malicious fault list method herein and, in the context of step 32 in FIG. 1, can inject selected faults into the fault list generation (FLG) routine, using a hardware-based fault injection module (FIM). The module 601, 602, 603 which is determined to have the highest probability of detecting faults for the new input is selected by control module 611 to calculate system output 613. When a fault is detected, fault information regarding modules 601, 602, 603 is received by control module 611 via fault analysis modules 607, 608, 609, respectively. In addition to fault information, control module 611 also receives the result in output compare and select module 610. As each of modules 601, 602, 603 are analyzed for faults, the others of modules 601, 602, 603 can process data from system input 612, with fault analysis modules 607, 608, 609 deactivated. Majority voting on the other modules 601, 602, 603 not under analysis can be used to determine the correct output, which is compared to the output of the module 601, 602, 603 under test. If an error is detected, then the module 601, 602, 603 under test is determined to have an uncovered fault. After each module 601, 602, 603 has been evaluated, then the module 601, 602, 603 with the best fault coverage can be used to process the next data from system input 612. If the nature of the fault necessitates, control module then can deactivate the faulty module 601, 602, 603.

Alternately, system 600 in FIG. 10 can employ the method according to the invention herein in conjunction with a system diagnostic, or self-test, procedure under the direction of master control module 611. In this example, system 600 can be placed into a diagnostic mode whereby system 600 is isolated from system input 612 and system output 613. Fault analysis modules 607, 608, 609 can supply input test vectors to fault processing systems 604, 605, 606, respectively, in addition to performing the aforementioned malicious fault list generation procedure. Similar to the previous example, output compare and select module 610 can monitor the responses of fault processing systems 604, 605, 606 to the input test vectors from modules 607, 608, 609, and report such data back to master control module 611. Each system 604, 605, 606 which is found to have an uncovered fault can be evaluated further, according to the nature of the fault. Where indicated, system 600 can be reconfigured such that a fault processing system 601, 602, 603 which does not provide the desired degree of fault coverage can be deactivated.

EXAMPLE

The malicious fault list generation method was applied to an Interlocking Control System (ICS) such as the MICROLOK railroad interlocking control system for railroad switching and signaling, as described in U.S. Pat. No. 5,301,906, which is assigned to the same assignee hereof, and which patent is incorporated herein by reference. The ICS utilizes a 6809 processor by Motorola Corp., Schaumberg, Ill., and is a fail-safe system. Fault lists were constructed for a single I/O cycle. The length of time for this I/O cycle to complete is approximately 200 milliseconds. The generation of the relevant data flow diagrams associated with this I/O cycle began after the simulation output file was generated. The total number of unique task output memory locations which were updated for this I/O cycle is 432. The construction of these data flow diagrams took approximately 1 week to accomplish on a Sun Sparc 2 computational server from Sun Microsystems, Inc., Mountain View, Calif. The associated fault trees with each data flow diagram were generated next. The fault tree construction process took approximately 14 hours on the Sun Sparc 2 computational server. A total of 96,059 fault trees were generated. These fault trees contain a total of 678,106 faults. The average number of faults per fault tree is 7. The size of the fault trees range from a low of 2 to a high of 514. Most of these fault trees contain 19 or less fault nodes.

A small subset of the generated fault trees were selected for evaluation; that is, 955 fault trees were evaluated. The fault injection process consists of: (1) providing the fault start time; (2) fault end time; (3) fault location; and (4) the fault mask describing the type of fault to inject. This information is placed in a file. A preselected ICS VHDL model then can be executed to perform the fault injection trial. If the fault is detected by the ICS error-handling routine, then the fault coverage information is written to an error-handling log file and the simulation ends. If the fault is not processed by the system error-handling routine, then the simulation ends at a predefined time with no information written to the error-handling log file. After the fault injection experiment is completed, then the error-handling log file can be checked to determine if the fault was covered. Fault collapsing is then performed on the fault tree to update the fault node coverage status fields. This process can be continued until all the nodes in the fault tree are evaluated.

A total of 1849 fault injection experiments were performed to cover 5780 fault nodes. All of the injected faults were properly detected and processed by the ICS system. The observed fault coverage for these fault injection trails is 1.0. These fault injection experiments were performed on a cluster of seven (7) Sparc 2 workstations. These fault injection trials took approximately 2 weeks to accomplish running, one fault injection experiment per machine 24 hours a day. Specifically, each machine was given a separate fault tree to evaluate. The graph coverage of each fault tree can occur independently on each workstation.

One of the other figures-of-merit that is typically obtained during fault injection experiments is the latency associated with each injected fault, i.e., specifically, the time period a fault remains latent before producing and error is typically measured or fault latency. For the fault injection method used for the malicious fault list generation method, the fault latency is generally zero. This zero fault latency is caused by the error injection process at the beginning of the fault window of opportunity for a given fault. Additionally, the time period that an error remains undetected is also typically measured during a fault injection experiment. This time period is referred to as error detection latency.

While certain presently preferred embodiments of the invention have been illustrated, it is understood that the invention is not limited thereto by may be otherwise variously embodied and practiced within the scope of the following claims.

We claim:

1. A method for selecting and responding to a malicious fault in a reconfigurable electronic apparatus, said apparatus for performing a plurality of tasks and having a first configuration and fault processes for counteracting a class of faults generally causing said apparatus to fail if said fault processor is unavailable, said malicious fault belonging to said class, occurring during execution of a preselected task by said apparatus, and causing said apparatus to fail during such execution, said preselected task being selected from said plurality of tasks, said method comprising the steps of:

a. constructing an information flow representation of at least a portion of said apparatus executing said preselected task;

b. applying a preselected fault representation to said information flow representation and producing a plurality of input error conditions corresponding to at least one preselected output condition;

c. selecting from said plurality of input error conditions at least one fault condition corresponding to said class of faults;

d. injecting said at least one fault condition into said information flow representation and producing a malicious fault condition representative of said malicious fault, said malicious fault belonging to said class of faults occurring during execution of said preselected task by said apparatus and causing said apparatus to fail during such execution; and e. modifying said apparatus from said first configuration to a second configuration responsive to said malicious fault condition and counteracting said malicious fault thereby.

2. The method of claim 1 wherein said information flow representation of step (a) includes a directed graph data structure having a plurality of nodes and a plurality of arcs.

3. The method of claim 1 wherein said preselected fault representation includes reverse implication.

4. The method of claim 3 wherein said reverse implication is recursive reverse implication.

5. The method of claim 3 wherein step (b) of claim 1 further comprises the step of generating a fault tree using said reverse implication fault representation.

6. The method of claim 1 wherein step (a) further comprises the step of generating a simulation trace file representative of said at least a portion of said apparatus executing said preselected task.

7. The method of claim 6 further comprising the step of constructing from said simulation trace file a directed graph data structure having a plurality of nodes and a plurality of arcs.

8. The method of claim 1 wherein step (d) further includes the step of fault collapsing.

9. The method of claim 1 wherein said selecting further includes selecting selected ones of unevaluated faults which occur earliest in time relative to others of said unevaluated faults.

10. The method of claim 1 wherein said selected ones of unevaluated faults excludes latent faults.

11. The method of claim 1 wherein said reconfigurable electronic apparatus is at least one of a fault processing system and a combinational circuit.

12. The method of claim 11 wherein step (a) of claim 1 further comprises the step of generating a simulation trace file representative of said at least a portion of said apparatus executing said preselected task.

13. The method of claim 12 further comprising the step of constructing a directed graph data structure having a plurality of nodes and a plurality of arcs from said simulation trace file.

14. The method of claim 13 wherein said preselected fault representation includes reverse implication and wherein step (b) of claim 1 comprises the step of applying said reverse implication fault representation to selected ones of said plurality of nodes and said plurality of arcs, producing said plurality of input error conditions thereby.

15. The method of claim 14 wherein said applying said reverse implication fault representation further comprises the step of generating a fault tree.

16. The method of claim 14 wherein step (d) of claim 1 further includes fault collapsing.

17. The method of claim 14 wherein said selecting excludes latent faults.

18. The method of claim 11 wherein said fault processing system is an interlocking control system.

19. The method of claim 14 wherein step (b) of claim 1 further comprises the step of performing a forward consistency check on said selected ones of said plurality of nodes having a plurality of outputs to selected others therefrom, said selected others having reconvergent fanout.

20. The method of claim 1 wherein said constructing an information flow representation of at least a portion of said apparatus executing said preselected task comprises the steps of:

a. isolating said preselected task from others of said plurality of tasks;

b. generating a simulation file representative of said apparatus executing said preselected task; and c. generating an information flow representation of said apparatus executing said preselected task from said simulation file.

21. A method for responding to a malicious fault in a reconfigurable electronic apparatus, said apparatus for performing a plurality of tasks and having a first configuration and a fault processor for counteracting a class of faults generally causing said apparatus to fail if said fault processor is unavailable, said malicious fault belonging to said class of faults, occurring during execution of a preselected task by said apparatus, and causing said apparatus to fail during such execution, said preselected task being selected from said plurality of tasks, said method comprising the steps of:

a. isolating said preselected task from others of said plurality of tasks;

b. generating a simulation file representative of said apparatus executing said preselected task;

c. generating an information flow representation of said apparatus executing said preselected task from said simulation file;

d. applying a preselected fault representation to said information flow representation and producing a plurality of input error conditions corresponding to at least one preselected output condition;

e. selecting from said plurality of input error conditions at least one fault condition corresponding to said class of faults;

f. injecting said at least one fault condition into said information flow representation and producing a malicious fault condition representative of said malicious fault, said malicious fault belonging to said class of faults generally causing said apparatus to fail if said fault processor is unavailable, said malicious fault occurring during execution of said preselected task by said apparatus and causing said apparatus to fail during such execution; and g. modifying said apparatus from said first configuration to a second configuration responsive to said malicious fault condition and counteracting said malicious fault thereby.

22. The method of claim 21 wherein said information flow representation of step (c) includes a directed graph data structure having a plurality of nodes and a plurality of arcs.

23. The method of claim 22 wherein step (b) of claim 21 further comprises the step of performing a forward consistency check on said selected ones of said plurality of nodes having a plurality of outputs to selected others therefrom, said selected ones having reconvergent fanout.

24. The method of claim 21 wherein said preselected fault representation includes reverse implication fault representation.

25. The method of claim 24 wherein said reverse implication fault representation is recursive reverse implication fault representation.

26. The method of claim 21 wherein step (f) further includes the step of fault collapsing.

27. The method of claim 21 wherein said selecting further includes the step of selecting selected ones of unevaluated faults which occur earliest in time relative to others of said unevaluated faults.

28. The method of claim 21 wherein said selected ones of said unevaluated faults excludes latent faults.

29. The method of claim 21 wherein said reconfigurable electronic apparatus is at least one of a fault processing system and a combinational circuit.

30. The method of claim 29 wherein said fault processing system is an interlocking control system.

31. The method of claim 30 wherein said interlocking control system is an interlocking control system for railroad switching and signaling.

32. The method of claim 24 wherein step (c) of claim 21 further comprises the step of generating a fault tree using said reverse implication fault representation.

* * * * *

UNITED STATES PATENT AND TRADEMARK OFFICE
CERTIFICATE OF CORRECTION

PATENT NO. : 5,561,762

DATED : October 1, 1996

INVENTOR(S) : D. TODD SMITH, BARRY W. JOHNSON, JOSEPH A. PROFETA, THEO C. GIRAS

It is certified that error appears in the above-indentified patent and that said Letters Patent is hereby corrected as shown below:

Column 18, line 7, change "processes" to --processor--.

Signed and Sealed this

Twenty-second Day of April, 1997

Attest:

BRUCE LEHMAN

*Commissioner of Patents and Trademarks*

*Attesting Officer*